Jan. 9, 1923.  H. FENNELL.  1,441,565.
BIFOCAL LENS.
FILED FEB. 23, 1922.

Inventor
Harry Fennell
By Stockbridge & Borst
Attorneys

Patented Jan. 9, 1923.

1,441,565

UNITED STATES PATENT OFFICE.

HARRY FENNELL, OF EVERETT, MASSACHUSETTS.

BIFOCAL LENS.

Application filed February 23, 1922. Serial No. 538,502.

*To all whom it may concern:*

Be it known that I, HARRY FENNELL, a citizen of the United States, residing at Everett, in the county of Middlesex and State of Massachusetts, have invented certain new and useful Improvements in Bifocal Lenses, of which the following is a full, clear, and exact description.

My invention is designed for the production of an improved form of bifocal lens which will have all of the advantages of the well known Kryptok fused bifocal and will overcome certain objections thereto.

The Kryptok bifocal consists of a body portion of crown glass and a segment of flint glass fused in a recess in the body portion. Both sides of the finished lens have even or continuous surfaces, and one side of the reading segment is exposed. Flint glass is much softer than crown glass and contains lead in its composition. As a result, the exposed surface of the reading segment of a Kryptok lens is more easily scratched than the remaining portion of the lens and after long use becomes dull or partially opaque. In addition, oxidization or other chemical action takes place on the exposed surface of the segment. Exposure to the atmosphere, after a while, causes the formation of a yellowish film on the outer surface of the reading segment, and perspiration causes the formation of a white film thereon.

The object of my invention is to provide a bifocal lens of the general type of the Kryptok lens in which the scratching or abrading of the reading segment, as well as the formation of a film thereon from chemical action, is effectually prevented.

A further object of the invention is to minimize or completely remove the chromatic colors present in the Kryptok lens in the high reading additions, due to the fact that the dispersion of the flint glass is not overcome by the crown glass used.

Other objects of the invention will hereinafter appear.

The invention resides in the lens and in the blank from which it is made, and consists of a bifocal lens or blank comprising a body portion and reading segment composed of glass of different indices of refraction, the reading segment being enclosed within the body portion and integrally united thereto.

It also consists of a bifocal lens or blank comprising a body portion, a reading segment fused into a recess in the body portion and a layer of glass covering said segment and fused thereto and to the body portion, the layer of glass being of the same index of refraction as the glass of the body portion but of a different index of refraction from that of the segment.

It also consists in certain features, characteristics, and details of construction which will be hereinafter more fully described and claimed.

In the drawings forming part of the specification:

My improved lens, as well as the blank therefor, is an integral structure comprising a body portion 1 and a reading segment 2, the latter being enclosed within and surrounded by the body portion. The body portion and reading segment are composed of glass of different indices of refraction, the former being preferably made of what is known as crown glass and the latter of what is known as flint glass. In order to obtain greater focal power through the reading field of the lens the segment 2 is made of flint glass which has a higher refractive index than the crown glass of the body portion 1. The opposite sides of the finished lens have even continuous surfaces, and both are of glass material of the same index of refraction. The segment 2 is shown as seated in a spherical recess in the body portion 1 and as covered by a layer or film of glass 3, all parts being integrally united.

Figure 7:
Figure 8:
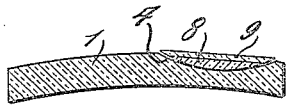

One method of producing my improved lens is as follows:

I first form a spherical recess or depression 4 in the surface of a block 1 of crown glass, which constitutes the body portion of the lens or blank. This block may be of circular, square or other suitable contour and is sufficiently thick to accommodate the recess 4 and provide the necessary material required to enable it to be ground away for the production of the proper curvatures on the surfaces of the finished lens. I then prepare what is known as a "button," for inserting and fusing into the recess 4. This I do by fusing together two small circular discs of glass 5 and 6, whose diameter is approximately the same as that of the recess 4. The disc 5 is of glass having the same index of refraction as the block or body portion 1, whereas the disc 6 is of glass having a different and preferably higher index of refraction. That is, the discs 5 and 6 may be respectively made of what are known as crown and flint glass. The adjoining surfaces of the two discs 5 and 6 are shown as plano, although this is not absolutely essential. After the discs 5 and 6 have been fused to each other, the flint glass side of the integrally united parts is ground and polished upon a plus or convex curve, corresponding substantially with the curvature of the recess 4, the grinding being continued until a portion, at least, of the edge of the crown glass disc 5 is ground away, as shown in Fig. 7. A "button" 7 is thus produced composed of a lower portion 8 of flint glass and a relatively thin, flat cover portion 9 of crown glass. In actual practice the thickness of the crown glass cover portion 9 need not be more than two or three millimeters, and the widest diameter of the same need not be more than two or three millimeters greater than the widest diameter of the flint glass portion. While the convex surface of the "button" 7 corresponds substantially with that of the recess 4 in the body portion 1, I prefer that the same be ground upon a slightly stronger curve,—that is, upon a curve of shorter radius.

Figure 1:
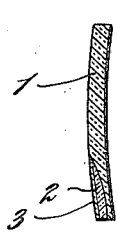
Fig. 1 is a sectional view of a finished lens embodying my invention.
Figure 2:
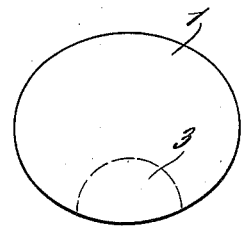
Fig. 2 is a face view of the same.
Figure 3:
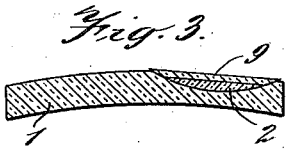
Figs. 3 and 4 are sectional and plan views respectively of the blank.
Figure 4:
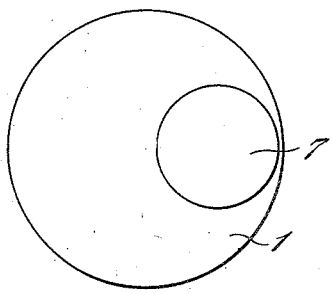
Figure 5:
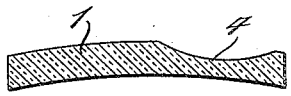
Figs. 5, 6, 7 and 8 are sectional views of the different elements from which the lens is made, indicating the successive steps in the manufacture of the lens.
Figure 6:
Figure 9:
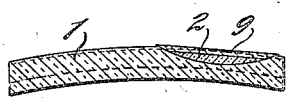
Fig. 9 is a sectional view of a blank showing in dotted lines how the same should be ground for the production of the lens.

The button 7, is afterwards placed in the recess 4 in the block 1, subjected to heat in a suitable furnace, and fused in the usual manner well known in the manufacture of Kryptok bifocals. The resultant product is a lens blank such as represented in Figs. 3 and 9 of the drawing,—that is, an integral or fused blank composed of a body portion 1 of crown glass and a reading segment 2 of flint glass wholly enclosed within and protected by the body portion. As the different glass elements are fused together, an integral unitary structure is produced in which the flint glass reading segment 2 is seated in the recess 4 of the crown glass body portion 1 and is covered and protected by the crown glass layer 9.

To produce a finished lens from this blank, the opposite surfaces thereof are ground and polished and the lens cut to eye size and edged, in a manner well known in the art. The grinding of the side of the blank containing the button 7 is permitted to proceed just far enough to cut away a part of the crown glass portion 9 of the button but not far enough to penetrate or expose the flint glass segment, as indicated in dotted lines in Figure 9. In the finished lens, the flint glass portion 8 of the button becomes the reading segment 2 and the latter is covered by the thin film or layer 3 produced by grinding away a part of the crown glass portion 9 of the button.

It will thus be seen that in the finished lens made in accordance with my invention, the flint glass reading segment is enclosed within the crown glass body portion and that no portion of either surface thereof is exposed so that it may be scratched or subjected to chemical action from external substances.

In order to overcome the objection of chromatism, present in the Kryptok bifocal and due to the use of the crown and flint glass elements which have different dispersive powers, the portion 9 of the button 7 from which the layer or film 3 is produced, may be made of glass having a different dispersive power from that of the body portion 1. It must be of glass of the same index of refraction as that of the body portion and to secure the proper result its dispersive power should be less than that of the body portion. The lens thus made becomes in a measure achromatic. For example, what is known as hard crown glass having a refractive index of 1.512 and a dispersive index of 60.3 may be used for the body portion 1, and what is known as zinc crown glass having a refractive index of 1.512 and a dispersive index of 57.8 may be used for the portion 9 of the button 7.

I claim:

1. A bifocal lens or blank comprising a body portion and a reading segment composed of glass of different indices of refraction, the reading segment being enclosed within the body portion and integrally united thereto.

2. A bifocal lens or blank having a crown glass body portion and a flint glass reading segment, the latter being enclosed within and protected by the body portion, and the two parts of the lens being integral.

3. A bifocal lens or blank comprising a body portion, a reading segment fused into a recess in the body portion and a layer of glass covering said segment and fused thereto and to the body portion, the said layer of glass being of the same index of refraction as the glass of the body portion and of a different index of refraction from that of the segment.

4. A bifocal lens or blank comprising a crown glass body portion, a flint glass reading segment fused into a recess in the body portion and a layer of crown glass covering said segment and fused thereto and to the body portion.

5. A bifocal lens or blank comprising a body portion of one index of refraction and a reading segment enclosed thereby of a different index of refraction, the glass of the body portion having different dispersive powers on opposite sides of the segment.

6. A bifocal lens or blank comprising a body portion, a reading segment fused into a recess in the body portion and a layer of glass covering said segment and fused thereto and to the body portion, the said layer of glass being of the same index of refraction as the glass of the body portion but of a different dispersive power, and of a different index of refraction from that of the segment.

In witness whereof, I hereunto subscribe my signature.

HARRY FENNELL.